United States Patent [19]
Putzig

[11] Patent Number: 4,618,435
[45] Date of Patent: Oct. 21, 1986

[54] ORGANIC TITANIUM COMPOSITIONS FOR USE IN OIL AND GAS WELLS

[75] Inventor: Donald E. Putzig, Newark, Del.

[73] Assignee: E. I. Du Pont de Nemours and Company, Wilmington, Del.

[21] Appl. No.: 823,122

[22] Filed: Jan. 27, 1986

Related U.S. Application Data

[63] Continuation of Ser. No. 540,721, Oct. 11, 1983, abandoned.

[51] Int. Cl.$^4$ ............................................... C09K 7/02
[52] U.S. Cl. ............................... 252/8.551; 252/8.553; 166/293; 166/294; 556/56
[58] Field of Search ............... 252/8.55 C, 8.55 R; 166/293, 294; 260/429.5

[56] References Cited

U.S. PATENT DOCUMENTS

| | | | |
|---|---|---|---|
| 2,894,966 | 7/1959 | Russell | 260/429.5 |
| 2,950,174 | 8/1960 | Lagally | 8/116.1 |
| 3,804,174 | 4/1974 | Chatterji et al. | 166/293 |
| 3,888,312 | 6/1975 | Tiner et al. | 166/308 |
| 3,894,966 | 7/1975 | Conway | 502/304 |
| 4,159,209 | 6/1979 | Womersley | 106/308 |
| 4,462,917 | 7/1984 | Conway | 252/315.3 |

Primary Examiner—Paul R. Michl
Assistant Examiner—Alex H. Walker

[57] ABSTRACT

A dry, solid mixture of
(a) the reaction product of

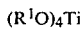

with (i)

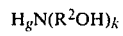

at a titanate:amino alcohol mol ratio of about 1:1, or (ii)

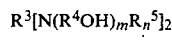

at a titanate:amino alcohol mol ratio in the range between about 1:1 and about 2:1, and
(b) a monosaccharide, disaccharide, or polyhydric alcohol which can be obtained by reduction of a monosaccharide, in an amount sufficient to enhance the uniform crosslinking capacity of said reaction product, wherein
$R^1$ is $C_{1-6}$ alkyl;
each of $R^2$, $R^3$ and $R^4$ is $C_{1-6}$ alkylene;
$R^5$ is H or $C_{1-6}$ alkyl;
k is 1–3 and g plus k equals 3; and
m is 1 or 2 and m plus n equals 2.

Mixtures are useful in thixotropic cements and in fluid fracture formulations for oil wells.

11 Claims, No Drawings

ORGANIC TITANIUM COMPOSITIONS FOR USE IN OIL AND GAS WELLS

This application is a continuation of application Ser. No. 540,721 filed Oct. 11, 1983, now abandoned.

BACKGROUND OF THE INVENTION

The present invention relates to dry, solid compositions containing an organic titanate/amino alcohol reaction product plus a mono- or disaccharide or a polyhydric alcohol derivable from a monosaccharide. The compositions are useful in preparing thixotropic cements and fluid fracture formulations for use in oil and gas wells.

It has long been known that titanium esters react with high molecular weight hydroxyl-containing compounds so as to crosslink them and produce gels; J. Oil and Colour Chem. Assoc. 31, 405 (1948). However, the crosslinking reaction made through the use of simple alkyl esters of titanium proceeds too rapidly for most industrial uses. The crosslinking rate imparted by titanium esters can be depressed by combining a titanium ester with a variety of multifunctional compounds, including triethanolamine.

The reaction product of tetraisopropyl titanate (also known as tetraisopropoxytitanium) and triethanolamine, at a titanate:triethanolamine mol ratio of 1:2, finds several industrial uses. Among others, that reaction product is used to crosslink high molecular weight compounds (e.g., hydroxypropyl guar gum), and the crosslinked high molecular weight material is used to fracture oil-bearing formations; that type of use is disclosed in U.S. Pat. No. 3,888,312. The reaction product of tetraisopropyl titanate and triethanolamine, at a titanate:triethanolamine mol ratio of 1:1, has had little if any industrial use. On the other hand, it has been disclosed in U.S. Pat. No. 2,950,174.

In the preparation of both of the foregoing titanate:triethanolamine reaction products, 2-3 mols of isopropanol are liberated from the titanate and it is common to use or sell the reaction product without removing the isopropanol. On the other hand, it has been proposed to react the amino alcohol with the titanate, add a polyhydroxyorganic compound as a stabilizer, evaporate the alcohol liberated in the reaction between the titanate and the amino alcohol, and replace the evaporated alcohol with enough water to dissolve the stabilized amino alcohol:titanate reaction product; see U.S. Pat. No. 2,894,966.

The use of thixotropic cements in oil and gas wells is well known; see for example U.S. Pat. Nos. 2,890,752 and 3,804,174. In the former, Portland cement is combined with a hydrocarbon liquid and an alkali metal soap. In the latter, a hydraulic cement (such as Portland, aluminous or pozzolanic hydraulic cement) is combined with a cellulose ether and a salt of zirconium, lead, chromium, ferric iron, hafnium, lanthanum or yttrium, preferably zirconium oxychloride.

The compositions of the present invention provide a number of advantages over those disclosed heretofore. For example, zirconium oxychloride is more toxic than the titanium compounds; it adversely affects the set rate of the cement and does not effect thixotropy in cements over the broad range of temperatures normally encountered in most wells, viz. 60°-135° C. Similarly, the reaction product of tetraisopropyl titanate and triethanolamine at a titanate:triethanolamine molar ratio of 1:2 did not perform satisfactorily in cements at the lower temperatures, and it is a liquid whereas a solid is preferred for dry blending with cement. If one attempts to remove water and/or alcohol from the products of U.S. Pat. Nos. 2,894,966 and 2,950,174, gummy solids, e.g., having the consistency of molasses, are obtained. Moreover, the liquid products of those patents (e.g., Example VIII of the former and XXIII of the latter) do not effect thixotropy at 60° C. as well as do the products of the invention.

DETAILED DESCRIPTION OF THE INVENTION

In particular, the composition of the present invention comprises a dry, solid mixture of (a) the reaction product of a titanate represented by the formula $$(R^1O)_4Ti$$

with (i) an amino alcohol represented by the formula $$H_gN(R^2OH)_k$$

at a titanate:amino alcohol mol ratio of about 1:1, or (ii) an amino alcohol represented by the formula $$R^3[N(R^4OH)_mR^5_n]_2$$

at a titanate:amino alcohol mol ratio in the range between about 1:1 and about 2:1, and (b) an additive, in an amount sufficient to enhance the uniform crosslinking capacity of said reaction product, which additive is a monosaccharide, a disaccharide, or a polyhydric alcohol which can be obtained by reduction of a monosaccharide, wherein $R^1$ is alkyl containing 1-6 carbon atoms;

each of $R^2$, $R^3$ and $R^4$ is alkylene containing 1-6 carbon atoms;

$R^5$ is H or alkyl containing 1-6 carbon atoms;

k is 1-3 and g plus k equals 3; and m is 1 or 2 and m plus n equals 2.

Because it is readily available, tetraisopropyl titanate is the titanate of choice. Triethanolamine, triisopropanolamine, tetrakis(hydroxyisopropylethylenediamine) and tetrakis(hydroxyethylethylenediamine) are examples of amino alcohols which are useful in the invention, with triethanolamine being preferred. Glucose, fructose, mannose, galactose and xylose are examples of monosaccharides useful in the invention, with glucose and fructose being preferred, particularly the latter. Sucrose, lactose, maltose and cellobiose are examples of disaccharides useful in the invention, with sucrose being preferred. Erythritol, arabitol, xylitol, sorbitol, dulcitol and mannitol are examples of polyhydric alcohols which can be obtained by reduction of a monosaccharide and which are useful according to the invention. Sorbitol is the preferred polyhydric alcohol for the purposes of the invention.

The proportion of the monosaccharide, disaccharide or polyhydric alcohol which is added to the titanate/amino alcohol reaction product varies over a wide range. It depends on a variety of factors: whether the composition is to be used in a thixotropic cement or in a fluid fracture formulation and the conditions encountered in either such use, the well depth, the types of strata encountered in the well, the identity of the titanate/amino alcohol reaction product, the identity of the additive (monosaccharide, disaccharide or polyhydric alcohol), and the like. Usually the additive:reaction product weight ratio is in the range between 1:10 and 10:1. Preferably, that ratio is in the range between about 3:10 and about 1:1. In the case of fructose, most preferably the weight ratio of fructose to the reaction product is in the range between 3.5:10 and 4:10.

The titanate/amino alcohol reaction product can be prepared by reacting equimolar proportions of the titanate and the amino alcohol and isolating the reaction product as a dry solid by removal of the isopropanol liberated in the reaction. The reaction can be run at ambient temperature or at elevated temperature. For example, the amino alcohol can be added with agitation to the titanate over a period of about one hour at a temperature in the range between about 40° and 50° C. Thereafter, agitation is continued in that temperature range for about 4 hours. If run at ambient temperature, the 4-hour period should be increased to about 8 hours. A variety of techniques may be used to remove the isopropanol liberated in the reaction. For example, a rotary vacuum ribbon dryer can be used, as can a graining bowl under vacuum. After separation of the reaction product from the isopropanol liberated in the reaction, it is dry blended with the additive.

The following Examples are given in further illustration of the invention but not by way of limitation.

EXAMPLE 1

Triethanolamine was added to tetraisopropyl titanate in a 1:1 mol ratio with agitation at 45°–50° C. over a period of one hour. Thereafter the reaction mixture was agitated for an additional period of about 4 hours at the same temperature. The reaction resulted in the liberation of isopropanol at an isopropanol:titanium mol ratio of about 3:1, giving a reaction product weighing 433 g. The isopropanol was evaporated from the reaction product in a rotary dryer over a period of about 2 hours at about 50° C. and about 30 inches of mercury vacuum to give 253 g of a dry solid product. The foregoing procedure was repeated so as to provide materials necessary to run the tests described below.

EXAMPLE 2

The reaction of Example 1 was repeated with triisopropanolamine at a tetraisopropyl titanate:triisopropanolamine mol ratio of 1:1 to give 296 g of a dry solid product.

EXAMPLE 3

The reaction of Example 1 was repeated with tetraisopropyl titanate and tetrakis(hydroxyisopropylethylenediamine) at a mol ratio of 1:1 to produce 346 g of a dry solid product.

EXAMPLE 4

Portions of the product of Example 1 were blended as follows:

(a) 25 g of fructose plus 67 g of the product of Example 1

(b) 50 g of fructose plus 67 g of the product of Example 1

(c) 25 g of sorbitol plus 67 g of the product of Example 1

(d) 50 g of sorbitol plus 67 g of the product of Example 1

(e) 25 g of glucose plus 67 g of the product of Example 1

(f) 50 g of glucose plus 67 g of the product of Example 1.

The following tests were run on the compositions of Examples 1–4 so as to develop information as to their suitability for use in thixotropic cement and in fluid fracturing. One of the tests measures the rate of crosslinking as a function of time and the other measures viscosity. Both types of tests involve the use of a base gel which was prepared by combining 4.5 g of hydroxypropyl guar with 750 ml of a 2% by weight KCl solution in water. The pH of the base gel was buffered to about pH 7 with fumaric acid and sodium bicarbonate.

In the test for determining the rate of crosslinking, 250 ml of the base gel were introduced into a 400 ml beaker equipped with a paddle blade agitator. The base gel was agitated at about 1250 rpm to develop a vortex in the center of the surface of the base gel in the beaker. An amount of the composition of the invention sufficient to provide 0.00021 mol of titanium was introduced and the time of introduction was noted. The presence of the composition in the gel caused the vortex to close (or disappear). When that occurred, the time was again noted. The period of time it took for the vortex to disappear is set forth as $T_1$ in the Table.

The method for taking viscosity measurements involves the use of the FANN 39 viscometer. The R-1, B-1 bob configuration was used at 80° F. (26.7° C.), 100 rpm (170 sec$^{-1}$) of shear, and the viscosity was noted at various time intervals set forth in the Table.

| Example | Rate of Cross-Linking $T_1$ (seconds) | Viscosity (centipoises) | | | | |
|---|---|---|---|---|---|---|
| | | 0 Minutes | 30 Minutes | 60 Minutes | 90 Minutes | Maximum |
| 1 | 68.7 | 8.75 | 3.65 | 2.5 | 1.9 | 8.75 |
| 2 | >180* | 2.1 | 0.5 | 0.4 | — | 2.1 |
| 3 | 95.0 | 2.1 | 4.3 | 3.0 | 2.3 | 10.5 (2 min.) |
| 4(a) | 5.67 | 20.3 | 8.5 | 6.8 | 5.6 | 20.3 |
| 4(b) | 3.33 | 11.0 | 4.9 | 3.4 | 2.6 | 11.0 |
| 4(c) | 7.28 | 7.2 | 4.8 | 3.7 | 2.9 | 8.4 (2.5 min.) |
| 4(d) | 4.61 | 5.0 | 3.75 | 3.25 | 2.85 | 5.8 (2 min.) |
| 4(e) | 8.05 | 8.0 | 2.3 | 1.4 | 1.2 | 8.0 |
| 4(f) | 4.52 | 8.0 | 2.85 | 1.7 | — | 8.0 |

*Test was not run for longer than 180 seconds.

I claim:

1. A composition comprising a dry, water soluble, solid mixture of (a) the reaction product of a titanate represented by the formula $$(R^1O)_4Ti$$

with (i) an amino alcohol represented by the formula $$H_gN(R^2OH)_k$$

at a titanate:amino alcohol mol ratio of about 1:1, or (ii) an amino alcohol represented by the formula $$R^3[N(R^4OH)_mR_n^5]_2$$

at a titanate:amino alcohol mol ratio in the range between about 1:1 and about 2:1, and
(b) an additive, in an amount sufficient to enhance the uniform crosslinking capacity of said reaction product, which additive is a monosaccharide, a disaccharide, or a polyhydric alcohol which can be obtained by reduction of a monosaccharide,
wherein
$R^1$ is alkyl containing 1–6 carbon atoms;
each of $R^2$, $R^3$ and $R^4$ is alkylene containing 1–6 carbon atoms;
$R^5$ is H or alkyl containing 1–6 carbon atoms;
k is 1–3 and g plus k equals 3; and
m is 1 or 2 and m plus n equals 2.

2. The composition of claim 1 wherein said titanate is tetraisopropyl titanate.

3. The composition of claim 1 wherein said amino alcohol is triethanolamine.

4. The composition of claim 1 wherein said amino alcohol is tetrakis(hydroxyisopropylethylenediamine).

5. The composition of claim 1 wherein said amino alcohol is tetrakis(hydroxyethylethylenediamine).

6. The composition of claim 1 wherein said additive is fructose.

7. The composition of claim 1 wherein said additive is sorbitol.

8. The composition of claim 1 wherein said additive is glucose.

9. The composition of claim 1, 2, 3, 4, 5, 6, 7 or 8 wherein said additive is present in an additive:reaction product weight ratio in the range between about 1:10 and 10:1.

10. The composition of claim 9 wherein said ratio is in the range between about 3:10 and about 1.1.

11. The composition of claim 2 wherein said amino alcohol is triethanolamine, and said additive is fructose which is present in a fructose:reaction product weight ratio in the range between about 3.5:10 and about 4:10.

* * * * *